Jan. 26, 1943. G. C. CHASE 2,309,240
CALCULATING MACHINE
Filed Feb. 1, 1940  8 Sheets—Sheet 1

Fig. 1

INVENTOR
George C. Chase
BY Stuart Wilder
ATTORNEY

Jan. 26, 1943.  G. C. CHASE  2,309,240
CALCULATING MACHINE
Filed Feb. 1, 1940  8 Sheets-Sheet 3

INVENTOR
George C. Chase
BY
Stuart Wilder
ATTORNEY

Jan. 26, 1943. G. C. CHASE 2,309,240
CALCULATING MACHINE
Filed Feb. 1, 1940 8 Sheets-Sheet 6

INVENTOR
George C. Chase
BY
Stuart ATTORNEY

Patented Jan. 26, 1943

2,309,240

UNITED STATES PATENT OFFICE 2,309,240

CALCULATING MACHINE

George C. Chase, South Orange, N. J., assignor to Monroe Calculating Machine Company, Orange, N. J., a corporation of Delaware Application February 1, 1940, Serial No. 316,738

30 Claims. (Cl. 235—63)

The invention has relation to calculating machines, and more particularly to automatic means for performing problems in multiplication. These means include elements in which a complete multiplier is stored, the stored multiplier digits being used successively to control the repeated registration of a multiplier in the product register.

According to one feature of the invention, both factors are "short cut," the one by registering the higher digit values (5 to 9) in the multiplicand, and the other by cycling in response to the higher digit values of the multiplier, according to the complemental method, wherein +7, for instance, is treated as +10—3, and +777 as +1000—223.

The invention consists in the novel construction and combination of parts, as set forth in the appended claims.

In the accompanying drawings, illustrating the invention.

ENTERING AND STORING A MULTIPLIER VALUE

Figure 1:
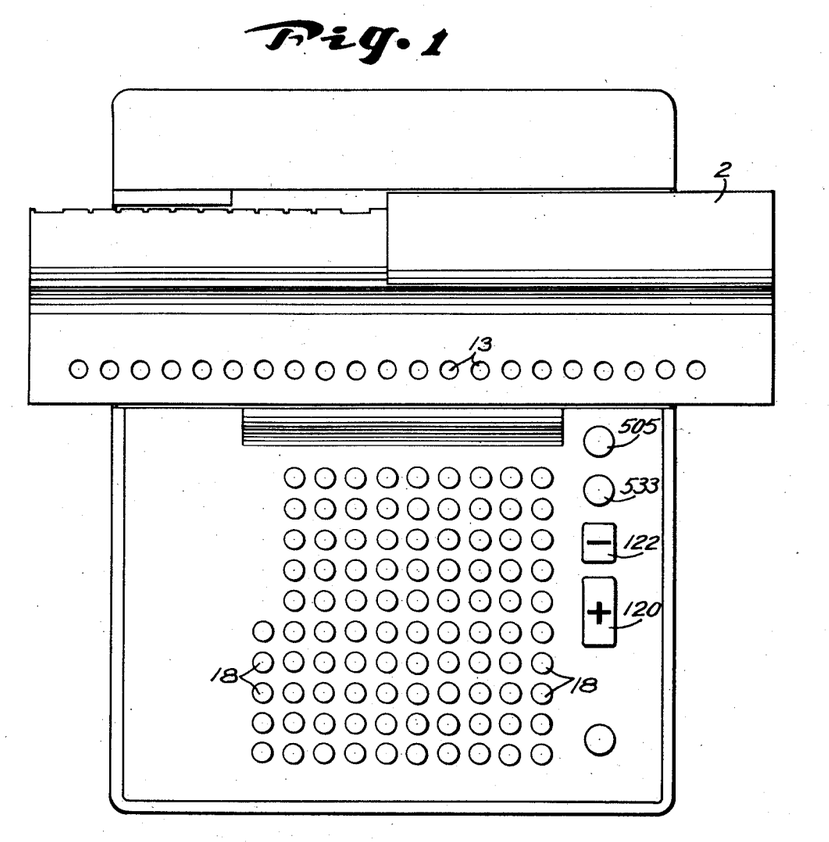
Fig. 1 is a plan view of a calculating machine embodying the invention, the numeral wheel carriage being shown in an intermediate position.

The value entering mechanism includes a keyboard 18 (Fig. 1) or its equivalent and a series of differential actuators conditioned by the keyboard mechanism for the transmission of selected digit values, either to the product register 13 or to the multiplier storage wheels to be hereinafter described. Normally the parts are set for product registration, and it is therefore necessary, in storing a multiplier value, to shift the transmission train. This is effected by means of a storage key 505 (Fig. 2), the stem of which key is provided with a pin contacting with one arm of a lever 506, fulcrumed at 507 on the side frame of the machine. A lug 508 on the rearward end of lever 506 underlies one of a pair of arms 509 (Figs. 2 and 3), pivoted on the right and left ends of differential actuator shaft 45, and supporting at their free ends a shaft 510. Pinions 511 are secured on each end of shaft 510, these pinions engaging segmental racks fixed on the machine frame to provide for parallel movement of the arms. Thus upon depression of key 505 the arms 509 and shaft 510 will be rocked about the axis of shaft 45.

Pinions 512 (Figs. 3 and 4) are mounted to rotate freely on shaft 510 and are brought into mesh with gears 513 of the multiplier controlling wheels when shaft 510 is raised. The arms 509 also support a shaft on which a series of intermediate pinions 514 are mounted, these pinions connecting pinions 512 with the output gears 201 of the differential actuators.

Figures 3, 4:
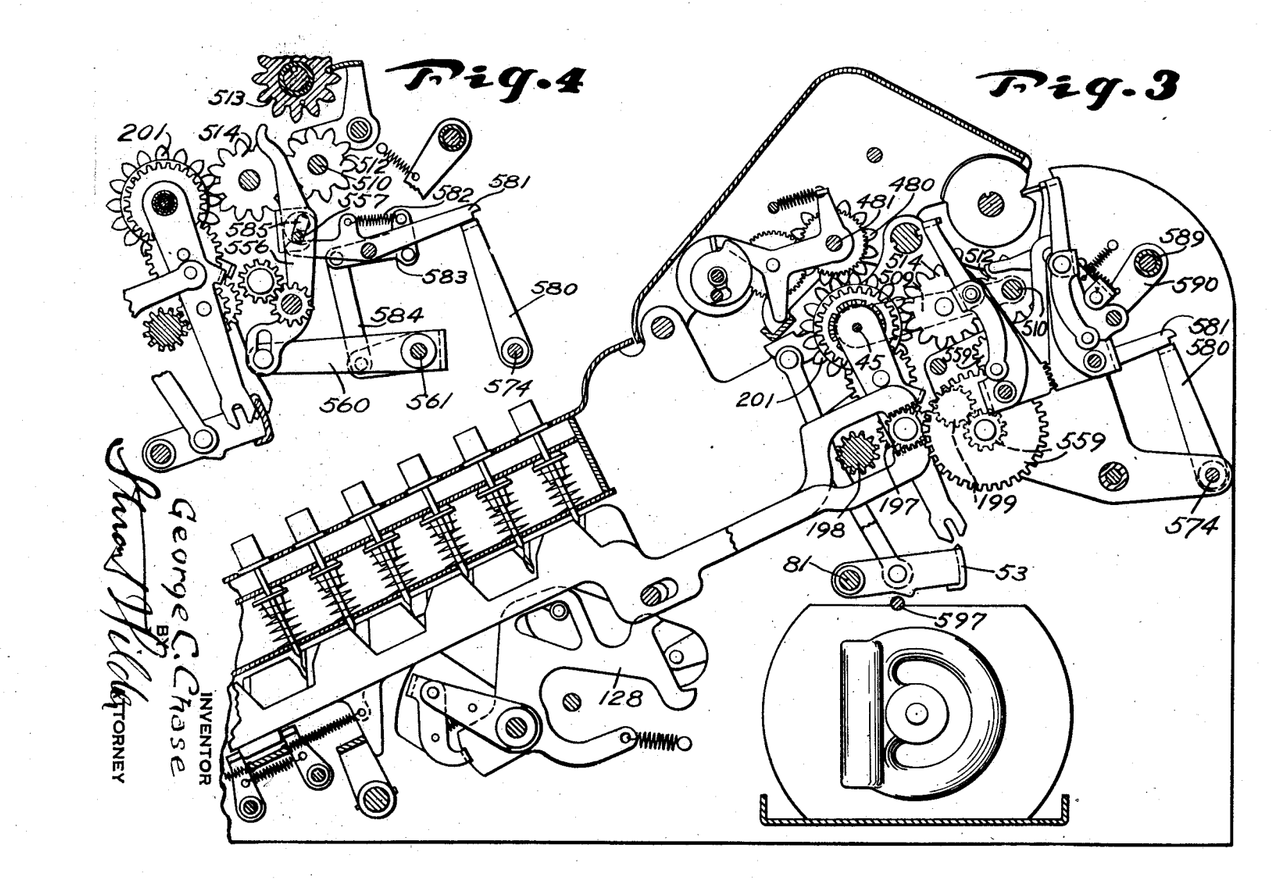
Fig. 3 is a section showing the mechanism immediately inside the right side frame.
Fig. 4 is a detail sectional view, showing certain mechanism which is hidden in Fig. 3.
Figure 5:
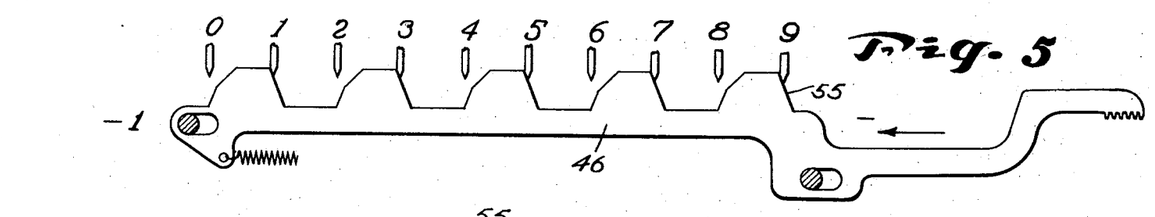
Figs. 5 to 8 are detail elevational views showing the four slides related to any one order of the digit entering mechanism.
Figure 6:
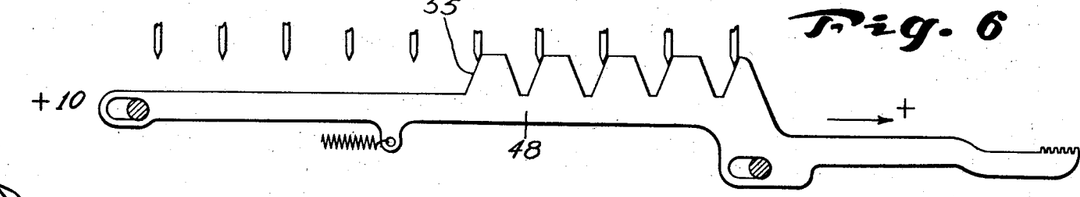
Figures 7, 8:
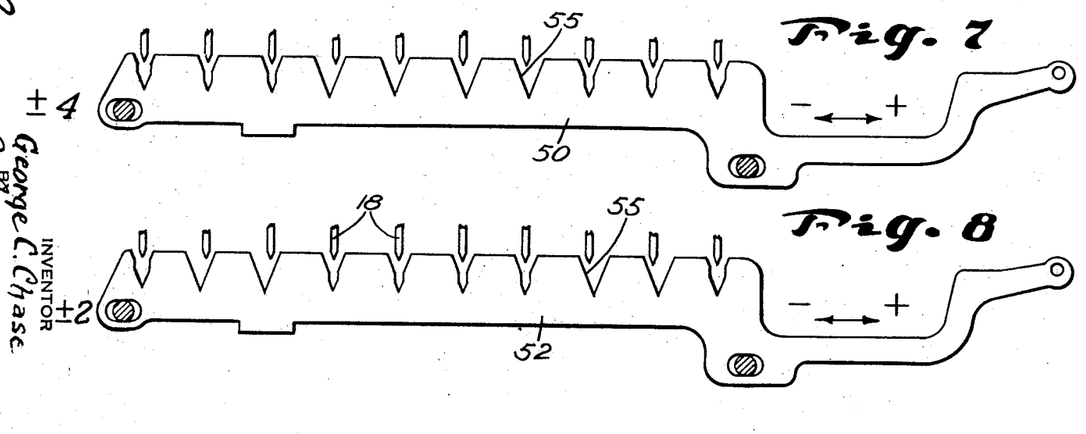

When the multiplier storage wheels are connected with the actuators upon depression of key 505, it is also necessary to disable the gear train between the actuators and the product register. Therefore, in the depression of key 505 a pin 515, secured in arm 509, is arranged to contact with and displace a segment 516, freely mounted upon the shaft 45, the segment meshing with a segmental pinion 517 splined to a shaft 518 mounted in the shiftable carriage 2, wherein the product wheels are mounted, this segmental pinion being held against shifting movement, in fixed relation to segment 516. Segments 519 are keyed upon each end of shaft 518, these segments being held in normal position, against suitable stops, by spring means and meshing with pinions 520, mounted to rotate upon studs secured in the right and left hand end plates of the carriage 2. Arms 521 are pivoted upon the carriage end plates, in line with the shaft of the product wheels, and support a shaft 481 upon which are mounted pinions 480 having gearing connection with the product wheels, as seen in Fig. 3. The outer ends of arms 521 are slotted to embrace pins 522 secured eccentrically in the pinions 520. Thus as pinions 520 are rotated by the segments 519 (about 160 degrees counterclockwise) the pinions 480 will be lifted out of engagement with the output gears 201 of the actuators.

A secondary function of the multiplier storage key is to free the multiplier storage wheels for rotation, for which purpose it is necessary to displace the carriage return bail 523 (Figs. 12 and 13) from engagement between the teeth of the multiplier storage gears. Bail 523 is pivoted on shaft 524 and is provided with a forwardly extending arm 525 which overlies a collar on shaft 510, so that when that shaft is lifted the bail will be withdrawn from the gears, against the tension of a spring to be later described.

A latch 526 is pivoted upon the lower end of the stem of key 505, and upon depression of the key will be brought into engagement with a stud 527 by means of a spring 528, thereby holding the key and the parts operated thereby in set position.

The multiplier may be set on the keyboard 18 either before or after the depression of key 505, the amount being entered in the differential actuators by a mechanism disclosed in the application for patent, Serial Number 176,156, filed on November 24, 1937, by the present applicant.

Figure 9:
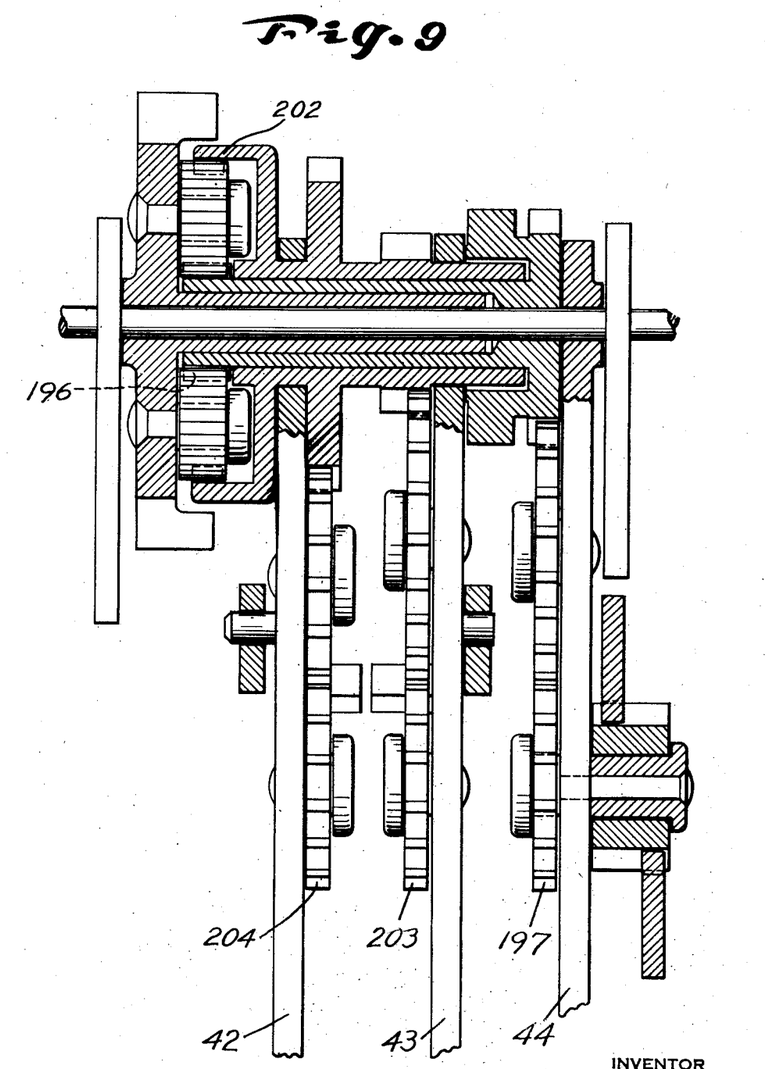
Fig. 9 is a front elevation, with parts broken into section, showing a unit of the differential actuating mechanism, drawn to a horizontal scale which is double the vertical scale.

Briefly, the keys 18 of each bank of the keyboard serve each to position one or more of the slides 46, 48, 50 and 52 illustrated in Figs. 5 to 8. The values represented by each of these slides is indicated at the left hand end of the figure, and the setting effected by the keys may be noted by comparing the cam surfaces 55 of the slides with the position of the key stems. It will be noted that the slides are set either forwardly or rearwardly, for a single step of movement, this movement serving to engage the pinions 197, 203 and 204 (Figs. 3 and 9) of oscillatory transmission trains connected with the differential actuator with one or the other of two oppositely driven gears 198, 199. The gear trains connected with the pinions 203 and 204 are of different gear ratio, and serve to drive the internal tooth gear 202 of a planetary actuator, while pinion 197 is connected through its gear train with the sun gear 196 of said actuator.

The gearing is designed to transmit and merge the values set by the slides in such a manner that the total or net value set in each denominational order will be transmitted through the related output gear 201, during each cycle of operation of the machine. Thus:

735 is set as:

$$7 = +1 \quad -2$$
$$\phantom{7 = +1} \quad -1$$
$$3 = \phantom{+1} \quad +4$$
$$\phantom{3 = +1} \quad -1$$
$$5 = \phantom{+1} \quad +1 \quad -4$$
$$\phantom{5 = +1 +1} \quad -1$$

and merged to register    +1  −3  +4  −5
or, upon reversal of the
drive of gears 198, 199__  −1  +3  −4  +5

This cycling is effected by means disclosed in application Serial Number 176,156, hereinbefore referred to, and also in United States Patent No. 1,566,650, issued December 22, 1925, to the present applicant, cycling being started by depression of a plus bar 120 or a minus bar 122 (Figs. 1 and 2) which keys serve to engage a clutch between an electric motor and the driving train to the gears 198, 199, and to determine the direction of rotation of said gears, in known manner.

Figures 10, 11, 15:
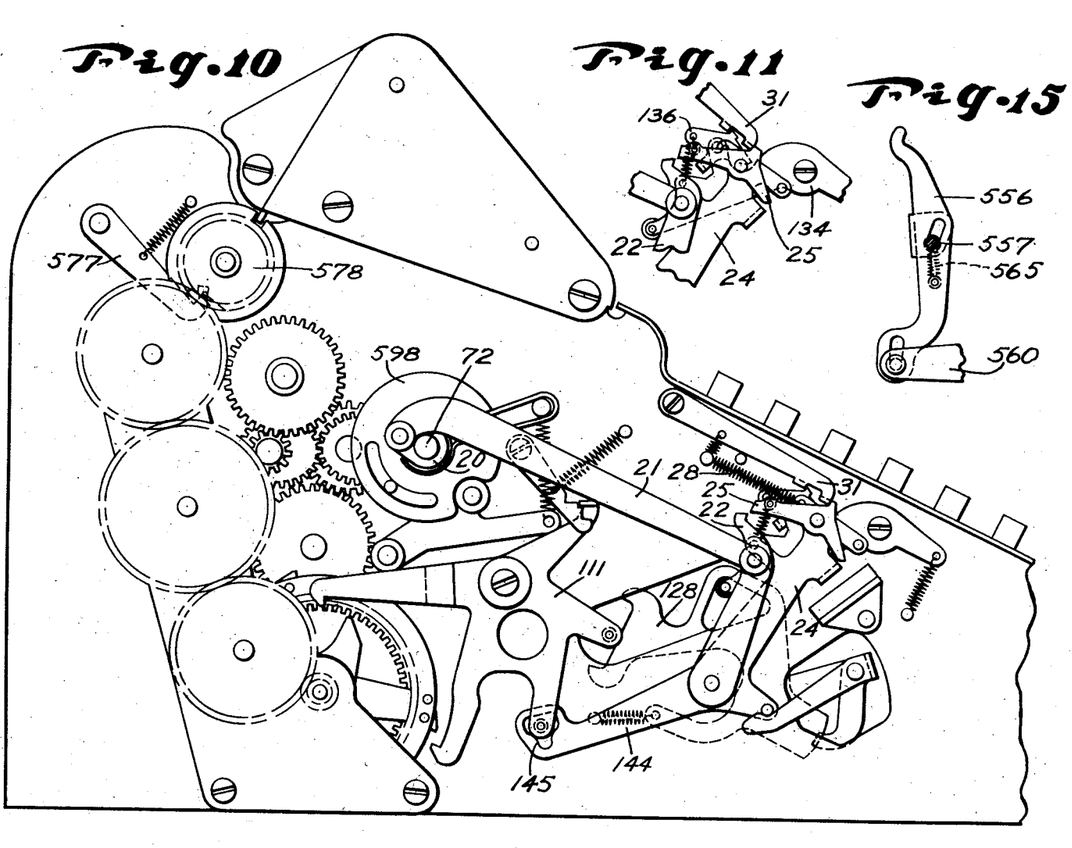
Fig. 10 is an elevation of mechanism located on the left side frame of the machine.
Fig. 11 is a detail elevation of certain mechanism shown in Fig. 10.
Fig. 15 is a right side elevation of the multiplier counting finger and associated parts.

In storing a multiplier, the storage key 505 being latched in depressed position, the key 120 or 122 is operated by being given a momentary depression and immediate release, the depressed key and clutch operating lever 128 (Figs. 3 and 10) being restored by suitable springs. Depression of either key serves, through the lever 128 and a setting lever 134 (Fig. 11) to position a tripping pawl 136 beneath a lug on a trigger 31, and upon release of the key by the operator pawl 136 will raise trigger 31, releasing a stopping pawl 25, which will thereupon fall into the path of movement of an oscillatory arm 22, connected by link 21 and arm 20 with a cyclically driven shaft 72. Pawl 25 is mounted on a stopping lever 24, and upon engagement of the pawl with arm 22, lever 24 will be rocked, bringing a cam surface 145, formed in a rearwardly extending arm 144 of said lever, into contact with a pin on the reversing clutch lever 111, and thereby disengaging the clutch.

The multiplier having thus been stored, and the machine brought to rest, key 505 will also be released, as follows:

Upon depression of key 505, the forward arm of a trigger 529, pivoted upon latch 526 will contact with and rest upon the upper offset end of a lever 530, fixed upon a sleeve 531, upon which stopping lever 24 is also mounted, a shoulder of trigger 529 being moved in front of the offset end of lever 530, by the trigger spring, upon forward movement of the stopping arm. Stopping lever 24 is returned to normal position by a spring 28, this movement rocking lever 530 and, through trigger 529, rocking latch 526 about its pivot and disengaging the latch from stud 527. The key 505 and the parts set thereby will now be restored to normal position, by means of a spring 532, which is secured at one end to lever 506 and at the other end to the frame of the machine.

Following storage of the multiplier, the multiplicand may be set on the keyboard 18 and the computation of the product initiated.

COMPUTATION OF THE PRODUCT

The multiplier storage wheels are mounted in the carriage 2 which carriage is normally located in its extreme left hand position when the multiplier value is stored and the computation begun. The multiplier counting finger and the sensing mechanism controlling the direction and duration of cycling are, therefore, located at the right hand side of the machine, normally in cooperating relation with the multiplier storage wheel of lowest denominational order. The control of carriage shifting, however, depends on the presence of values in the higher order wheels, and therefore the carriage return bail 523, hereinbefore referred to, is extended across the positions normally occupied by the cooperating elements of the multiplier storage wheels of higher order, but not across the position of the corresponding element of the lowest order wheel.

The various programs of machine cycling and carriage shifting, necessary to calculation with various multipliers, are governed by mechanism which is, of course, designed with reference to the above noted arrangement, and will best be described by following through the different operations called for by four typical multiplier settings, as follows:

Case A—0004 as a multiplier
Case B—4444 as a multiplier
Case C—0400 as a multiplier
Case D—0000—depression of the multiplication key with no multiplier set.

Case A (multiplier 0004)

This is typical of computations in which a multiplier digit of 1, 2, 3 or 4 is entered positively or negatively in the lowest or units order storage wheel, the other wheels being clear.

Upon depression of the multiplication key 533 (Figs. 1 and 2) a pin in the key stem will rock a bell crank lever 534, fulcrumed at 535 on the framing, pushing a link 536, which is pivoted to bell crank lever 534, toward the rear of the machine. The rearward end of link 536 is pivotally connected to a stud 537 fixed in the upper end of one of a pair of scissors levers 538 (Fig. 12), fulcrumed at 539 and inter-connected by segmental gear teeth. Thus upon depression of key 533 the upper ends of the scissors levers will be rocked toward each other, carrying therewith a pair of sensing levers 540, 541 which are intermediately fulcrumed upon the upper ends of the scissors levers. The lower end of subtraction sensing lever 541 is connected by means of link 544 (Fig. 2) with a bell crank lever 545, adapted to depress the minus bar 122. Similarly, the lower end of addition sensing lever 540 is connected by a link 542 with a bell crank lever 543 adapted to depress the plus bar 120. The upper ends of the sensing levers 540, 541 are provided with inwardly extending lugs adapted to be brought into contact, when the scissors levers are closed, with one of two opposed segmental surfaces 546, 547 of a controlling disk. One of these controlling disks is fixed upon each of the storage wheel gears 513, the disks standing in the position illustrated in Fig. 12 when no value is stored in the wheel.

Figure 12:
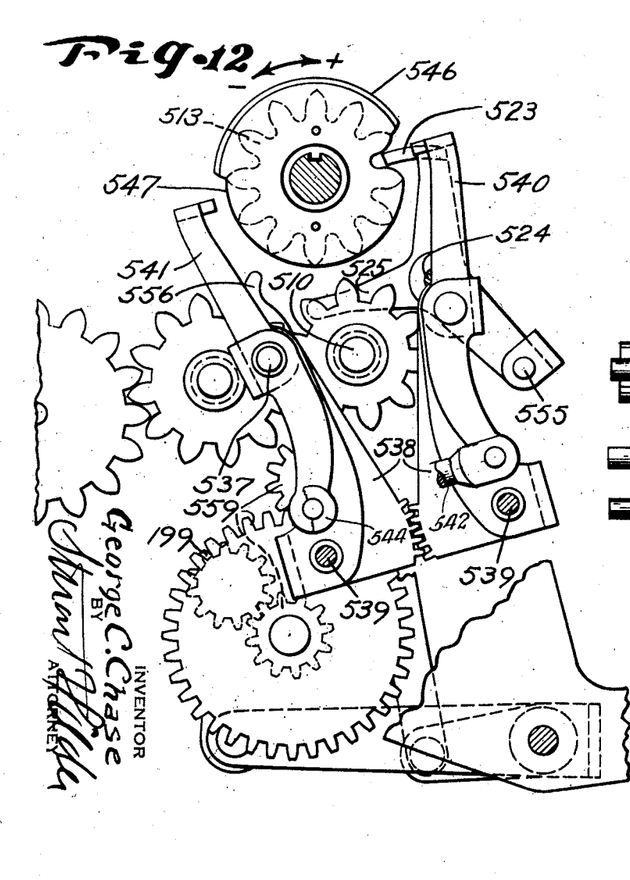
Fig. 12 is an enlarged side elevation, with parts broken into section, and showing certain mechanism hidden in Fig. 3.

If the assumed multiplier digit 4 has been entered in the storage wheel by depression of the plus bar the gear will be moved four steps or gear tooth spaces in a clockwise direction, from the position illustrated in Fig. 12, this bringing the segment 546 of the disk into the path of movement of the addition sensing lever 540 and the segment 547, of reduced diameter, opposite the subtraction sensing lever 541. Therefore, as the scissors levers are closed the subtraction sensing lever will fulcrum idly about its pivot upon link 544, while the addition sensing lever, contacting with the surface 546, will take a fulcrum upon such surface and the link 542 will be moved forwardly, causing bell crank lever 543 to depress the plus bar 120, and start the machine in addition. If the multiplier 4 has been stored by depression of the minus bar, the storage wheel will be moved four steps counter-clockwise from the position shown in Fig. 12, whereupon subsequent closing of the scissors levers will move the addition sensing lever 540 idly toward the surface 547, while the subtraction sensing lever 541 will take a fulcrum upon the surface 546, pulling the link 544 rearwardly and, through bell crank lever 545, depressing the minus bar 122 and starting the machine in subtraction.

Since the multiplication key 533 is to be struck, but not held depressed by the operator, means are provided to hold the plus or the minus bar depressed until the multiplier control wheel has been counted back to zero. This is accomplished by latching the bell crank lever 534 (Figs. 2, 17 and 18) in its set position, by engagement of a shoulder 548 of a bar 549 (pivotally connected to the bell crank lever) with an abutment 550, fast upon the frame of the machine.

The shoulder of bar 549 is engaged with this abutment in Case A examples only, by means of toggle links 551 connecting the lower ends of the sensing levers 540, 541 with the intermediate portion of a whiffletree 552. The forward end of whiffletree 552 has a pin overlying bar 549, and the rearward end overlies an arm of a T-lever 553, fulcrumed upon the framing of the machine and normally held by a spring 554 against a pin 555, fixed in an arm of the carriage return bail 523. The fulcruming of one of the sensing levers upon the surface 546 of the storage wheel disk will bring the lower ends of these sensing levers closer together when the scissors levers are closed, thus, through toggles 551 causing whiffletree 552 to fulcrum at its point of contact with T-lever 553 and thereby to depress the rear end of bar 549, to engage the latch. The downward movement of bar 549 occurs (upon the depression of multiplying key 533) simultaneously with the rearward movement of the bar by the bell crank lever 534, so that the latch clicks into place, sufficient yield in the downward pressure being provided for by spring 554. The path taken by the end of bar 549 in its rearward movement is illustrated at A, in dotted lines, Fig. 16. The latching of bar 549 holds the bell crank lever 534 in its set position, which in turn prevents the multiplication key 533 from returning to its normal position, a pin being provided in the stem of the key to retain the key partially depressed during the multiplication operation.

Figures 2, 14, 16:
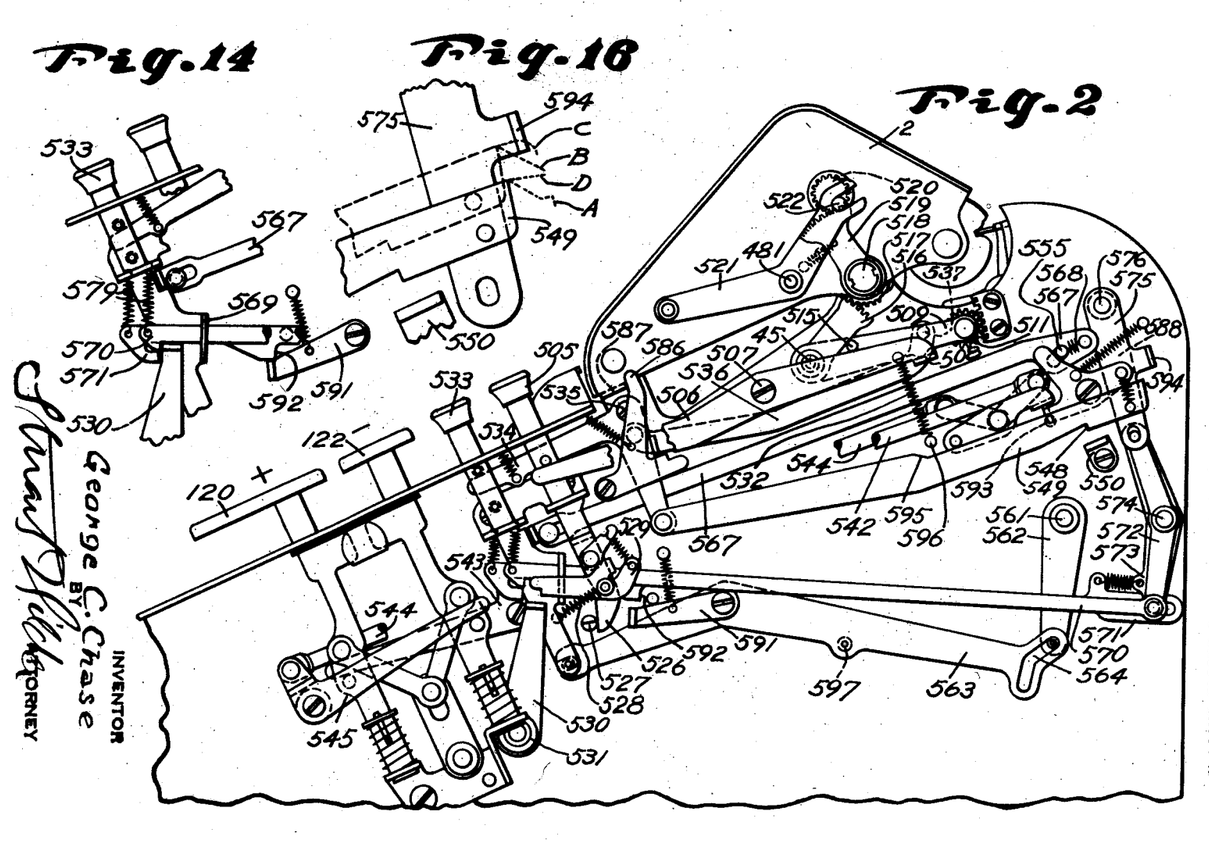
Fig. 2 is an elevation of mechanism located on the right side frame of the machine.
Fig. 14 is a right side detail elevation of the multiplying key and associated parts.
Fig. 16 is an enlarged detail elevation of certain mechanism shown in Fig. 2, two preliminary positions of the parts being shown in full and in broken lines and the path of subsequent movement being indicated by dotted lines.
Figure 13:
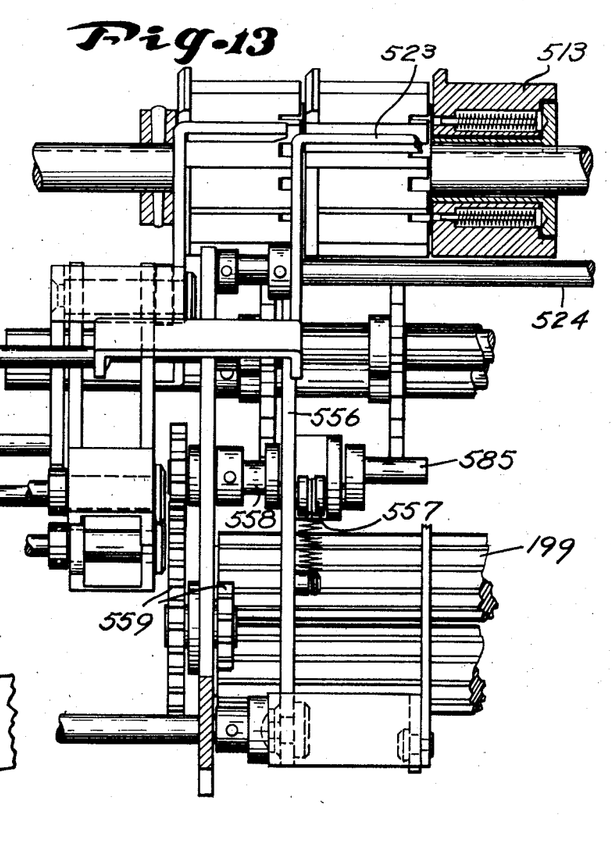
Fig. 13 is a rear elevation of the mechanism shown in Fig. 12.

The counting of the multiplier control wheel back to zero as the machine cycles is effected by means of a counting finger 556 (Figs. 4, 12, 13 and 15). This counting finger is mounted on an eccentric 557 formed on shaft 558, driven in cycle with the machine through the gearing 199 and 559 (Figs. 3, 12 and 13). Normally the counting finger is held downward, so that it may not engage with the teeth of the storage wheel gears 513, by means of a lever 560, a slot in the counting finger allowing the eccentric 557 to rotate without lifting the finger. Lever 560 is fixed upon a shaft 561 on the right hand end of which is also fixed an arm 562 (Fig. 2). A roller in arm 562 engages a cam slot 564 formed in one end of a lever 563, fulcrumed upon the side frame of the machine and having pin and slot engagement at its forward end with the stem of multiplication key 533. During the first half of the depression of the multiplication key the camming portion of the slot 564 swings the arm 562 forwardly and the lever 560 upwardly, these parts being held as set during the remainder of the multiplication key movement by engagement of the roller in the lower part of slot 564. In this raised position of lever 560, the counting finger will be drawn upwardly by a spring 565, so that the upper end of the finger will trace an annular path, during the rotation of eccentric 557, adapted to advance the related storage wheel gear one tooth, counter-clockwise or clockwise respectively, as seen in Fig. 4, during each cycle of addition or subtraction.

During the machine cycle which completes the registration of the multiplicand in accordance with the required multiplier digit, the multiplier storage wheel will be counted back to the zero position illustrated in Fig. 12.

This removes the segment 546 of the multiplier disk from beneath the lug of addition or subtraction sensing lever 540 or 541, allowing the lower end of the sensing lever to resume normal position under the influence of the plus bar or minus bar return springs. The plus or minus bar being restored, the machine will be brought to rest as hereinbefore described. Restoration of the lower end of the sensing lever to normal position will also retract the toggle 551, allowing a spring 568, connecting bar 549 with the T-lever 553, to lift the slide bar free of the abutment 550. This releases the latch, allowing bell crank lever 534 and multiplication key 533 to resume their normal positions before the end of the cycle.

It is to be noted that Case A includes multiplier digits 1, 2, 3, or 4 only, since multipliers 5 to 9 are treated complementally and consequently a multiplier digit is set up in the tens order storage wheel, which brings the calculation under the laws of Case B.

Case B (multiplier 4444)

This case covers all problems in which two or more multiplier digits are set up, one of the digits standing in the units order storage wheel. These digits may all be entered positively or all negatively, or some positively and some negatively, according to the rule of semi-complemental short cut operation.

It has been seen that the carriage return bail 523 is moved out of position between the teeth of the storage gears 513 during the storing of a multiplier value. In Case B operations certain of the higher order storage wheels have been rotated in the storage of the multiplier to bring the segment 546 or the segment 547 opposite this bail. Therefore, upon release of the storage key 505, bail 523 will be held out of the position illustrated in Figs. 2 and 12, thereby holding the pin 555 in the full line or the intermediate dotted line position shown in Fig. 18. It is immaterial to the functioning of the parts which of those two positions is assumed by the pin.

A latching bar 567 (Fig. 2) is provided with a slot in its rearward end embracing pin 555, a spring 568 being adapted to hold the bar forwardly against the pin. When the pin 555 is moved into the full line position or the intermediate dotted line position of Fig. 18, spring 568 presses the end of bar 567 against the stem of the multiplication key, ready to engage a shoulder of the key stem when the key is fully depressed (see Fig. 14). Depression of key 533 will also rock bell crank lever 534, as explained in Case A, to initiate plus or minus cycling of the machine. This cycling continues until the units multiplier control wheel is counted back to zero, whereupon machine cycling will be interrupted, in the manner previously described, and a shift of the carriage toward the right will be initiated, as follows:

A lug 569 (Fig. 14) is formed on the stem of the multiplication key 533, this lug being provided with guide slots engaged by the forward ends of right and left carriage shift links 570, 571. These links are pivoted at their rearward ends upon the right and left carriage shift levers 572, 573 (Fig. 2), the right shift lever 572 being secured to a shaft 574, journaled in the framing of the machine. The right shift lever 572 actuates a lever 575, secured upon the right hand end of a shaft 576, which extends across the machine and has fixed upon its left hand end the spring urged detent 577 (Fig. 10) of the carriage right shift clutch 578. This right shift clutch is provided with a shifting worm, operating as disclosed in United States Patent No. 1,964,478, issued to A. A. Overbury on June 26, 1934.

The links 570 and 571 are provided with springs 579 (Fig. 14) holding the links in position in the upper ends of the slots of the key stem, and tending to restore the links and key to normal position when the key is unlatched. In the latched position of the key, these links stand as shown in Fig. 14, a shoulder formed on the forward end of link 570 lying in the path of movement of the upper end of lever 530, and a shoulder in the forward end of link 571 standing below the offset end of said lever. Thus at the end of the computation of the first multiplier digit, lever 530, in its forward movement with stopping arm 24, will pull link 570 forward and release the clutch detent 577, the carriage now shifting to the right.

In certain cases it may be necessary to maintain shifting of the carriage toward the right through several ordinal positions, as in computation by a multiplier of 4004, which falls within Case B. With such a multiplier cycling will occur in the units order and again in the thousandths order, the carriage shifting continuously from the units to the thousandths zone. This maintenance of the shifting is effected by means of an arm 580 (Figs. 3 and 4) fixed to the shaft 574 which supports the carriage right shift lever 572. The upper offset end of arm 580 is adapted for engagement with a latch 581, pivoted upon the framing of the machine and provided with a spring 582 which at its other end is attached to a rocker 583. Rocker 583 is connected by a link 584 to the lever 560 and is provided with a pin normally holding the latch 581 clear of arm 580. So long as the multiplication key is latched in depressed position, lever 560 is held raised, and rocker 583 will allow latch 581 to rest upon the end of arm 580, under tension of the spring 582. Upon initiation of the carriage shift, the rocking of shaft 574 will displace arm 580 and latch 581 will fall behind said arm, latching the shift clutch detent in disengaged position, so that the clutch will continue to drive the carriage to the right. The release of latch 581 is conditioned by the operation of carriage shifting mechanism of novel design, which will now be described.

Figures 17, 18, 19:
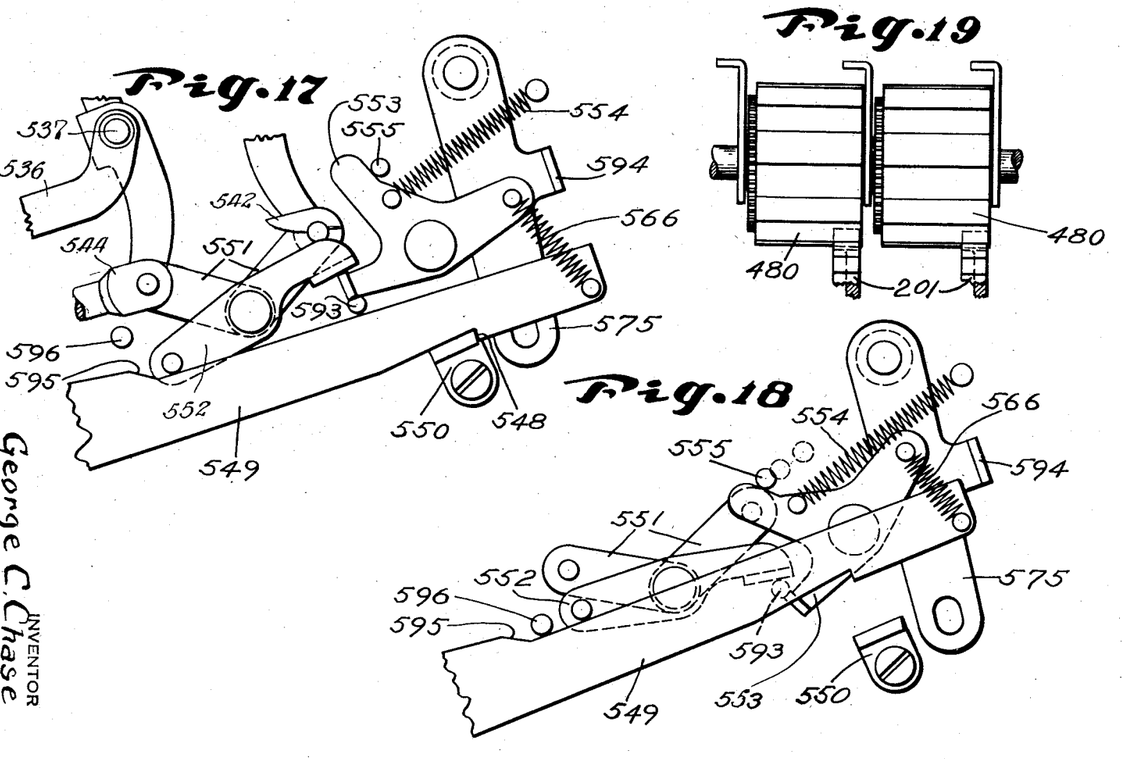
Figs. 17 and 18 are enlarged elevational views showing certain parts appearing in Figs. 2 and 16 in different positions assumed during a multiplying operation.
Fig. 19 is a detail rear elevation of a pair of transmission gears.

It is intended that machine cycling shall be resumed in a higher order while the carriage 2 is still being shifted towards its position of rest in said higher order zone. As shown, machine cycling may occur during the last three quarters step of shifting movement, the gears 488 and 513 being widened as seen in Figs. 13 and 19, for this purpose. If the multiplier is 4444 cycling will be resumed as soon as the carriage is shifted one quarter step. If the multiplier is 4004 cycling will be resumed at two and one quarter steps of shifting movement. This is effected by the movement of the next higher order multiplier control disk which is displaced from zero, into engagement with the addition sensing lever 540 or the subtraction sensing lever 541. The lugs on the upper ends of these levers are beveled on their left hand faces, and extend transversely somewhat more than three quarters of a column space, so that they will be held in active position by the segment 546 during that portion of the carriage shifting in which the machine may cycle. The segment 546 is also beveled, as shown in Fig. 13, to facilitate the sliding of the disk beneath the lug of the plus and minus sensing levers 540, 541 at the one quarter shifted position, to initiate a new registering operation of the machine.

If the carriage completes its shift before the completion of cycling, in a given column, it becomes necessary to interrupt the shifting movement. For this purpose an eccentric 585 (Figs. 4 and 13) is provided on the shaft 558 (in addition to the eccentric 557), this eccentric 585 being adapted to depress a forward arm of latch 581 during each cycle of machine operation. Thus during the first cycle following the carriage shift arm 580 will be released and allowed to drop back under the shoulder of latch 581, allowing the right shift clutch detent to ride upon the periphery of the clutch drum and to fall to clutch disengaging position, under the influence of its spring, as soon as the clutch has moved into its full cycle position. If, however, machine cycling is completed before the carriage has completed its shift, the carriage will continue shifting toward the right without interruption. The rocking of shaft 574, as the machine is brought to rest, will again lift the carriage shift detent away from the clutch and will simultaneously move arm 580 rearwardly, so that it will be re-engaged by the latch 581, providing for continuance of the shift.

When all of the multiplier storage wheels have been counted to zero the carriage return bail 523, under the influence of spring 554 of the T-lever 553, will drop between the teeth of the storage gears, the disks being notched to allow for this movement, as seen in Fig. 12. In this action pin 555 resumes its normal position and latching bar 567 (Fig. 2) is thereby moved rearwardly, releasing multiplication key 533 from its fully depressed position and carrying the forward end of the right shift link 570 upwardly, out of the path of movement of lever 530. This occurs during the latter part of the final registering cycle. In order to effect the return of the carriage at the end of this cycle, the forward end of the left shift link 571 will be held in the path of movement of lever 530. For this purpose a pin in the key stem engages the bell crank lever 534, which is independently latched in its set position by means of a spring latch 586, engaging a lug of the lever. Thus key 533 will remain in partially restored position during the return of the carriage. During the previously described Case A operations, latch 586 is held out of engaging position by means of a cam lug 587, located on the lower edge of the carriage framing, and adapted to engage the latch only when the carriage is located in its extreme left hand position.

The left shift link 571 being moved forwardly by lever 530, at the end of the last operative cycle of the calculation, the left shift lever 573 will be operated, thereby, through a lever 588 (indicated in dotted lines in Fig. 2) and a sleeve 589 (Figs. 2 and 3), releasing the shift clutch detent 590 from the left shift clutch. This left shift clutch is similar to the right shift clutch, as disclosed in Patent No. 1,964,478, hereinbefore referred to, except that the related shifting worm is provided with a reverse thread, so that upon operation of the clutch the carriage is shifted toward the left.

In order to hold the carriage shift detent in released position, allowing the clutch to operate, until the carriage is returned to its extreme left hand position, a spring pawl 591 (Figs. 2 and 14) is mounted on the side frame of the machine and is designed to move into position behind a shoulder 592 formed on the lower edge of the left shift link, when that link is moved forwardly as above described.

As the carriage comes into extreme left hand position the cam lug 587 will disengage latch 586 from bell crank lever 534 so that the multiplication key will rise to its normal position, lifting the left shift link 571 therewith and disengaging the link from pawl 591, said pawl engaging a pin fixed in the frame of the machine. The spring of the left shift detent 590 will now operate to disengage the clutch and return the levers, shifting link, etc. to normal position.

Because of the arrangement whereby machine cycling and carriage shifting may occur simultaneously, it has been seen that machine cycling may terminate before the carriage has completed its shift toward the right. Should that occur in the last multiplier position, the lever 539 will be operated to initiate a left shift of the carriage before the right shift has been completed. Patent No. 1,964,478 shows one form of a well known interlock mechanism between the right and left shifting detents (Fig. 7 of that patent), and a yielding connection is shown in Fig. 2 herewith between the left shift link 571 and the lever 573. Therefore, if the left shift clutch detent is held by such an interlock, the lever 573 will remain in normal position until the interlock is released, the shift link remaining latched in operating position.

As bar 549 has no function to perform in Case B examples, the following provision has been made to incapacitate it.

During the calculation, pin 555 stands in a forward position, holding the T-lever 553 tilted, against the tension of its spring 554. In this position of the T-lever, the rearward end of the whiffletree 552 will engage a pin 593 (Figs. 2, 17 and 18), this pin holding the whiffletree in the same position as when the rearward end thereof is held by the T-lever in its intermediate position. Upon closing of the scissors levers the mid portion of the whiffletree will be depressed by the toggles 551, and bar 549 will receive an idle movement to the rear, indicated in dotted lines at B, Fig. 16.

*Case C (multiplier 0400)*

This example represents any multiplier in which the units multiplier storage wheels stand at naught and in which one or more multiplier digits have been set in the higher order wheels. There is to be no machine cycling in the units order of the multiplier, and therefore a carriage shift is to be immediately initiated. The disk of the units multiplier storage wheel stands at naught so that the closing of the scissors levers upon the depression of the multiplication key will not effect the depression of the plus or the minus bar. In order to initiate carriage shifting the bar 549 will be so operated as to contact with a lug 594 (Figs. 16 and 18) of the right shift lever 575, and thereby move the clutch detent out of engagement with the right shift clutch. The pin 555 stands in its intermediate or forward position and the toggles 551 hold the mid portion of the whiffletree in raised position. The path of the bar (represented by the dotted lines at C, Fig. 16) is controlled in this rearward movement by a cam surface 595 of the bar, contacting with a pin 596 fixed in the frame, this providing for the depression of the rearward end of bar 549 below lug 594 at the end of the stroke.

The carriage shifting will be maintained, as previously described, until a displaced multiplier storage wheel contacts with the sensing levers, to start the machine cycling, from which point the calculation will proceed as in Case B.

Case D (wheels at 0000)

It may occur that the multiplication key 533 is accidentally or erroneously depressed when no multiplier has been set up. Theoretically no machine action should occur and the key should immediately return to its normal position, leaving all of the control mechanism also at normal. The present design provides for this. Since the units multiplier control wheel stands at naught machine cycling will not be initiated. The pin 555 stands in its normal position and therefore the rearward end of bar 549 will stand as shown in Fig. 2. If the multiplication key is depressed the toggle 551 is not extended so that the end of the bar moves rearwardly as shown by the dotted line D, Fig. 16, without functioning. The multiplication key is free to return to its normal position, since the latching bar 567 has been held rearwardly by pin 555; the shoulder of bar 549 did not engage the latching abutment 550, and because latch 586 is held out of action by the cam lug 587. If the multiplication key is depressed with the carriage standing anywhere except in its extreme left hand position, with no multiplier value installed, the bell crank lever 534 would be engaged by latch 586 and the key would be held partially depressed; no action would be initiated and the partially depressed key could be released by returning the carriage to the extreme left by hand or by other means.

GENERAL FEATURES

A universal bar 53 (Fig. 3) serves to lock the pendant gear train levers 42, 43 and 44 (Fig. 9) of the digit entering mechanism as set. This bar should be held in its raised (locking) position throughout the computation of all Case B and C examples, this being provided for by a pin 597 (Figs. 2 and 3) mounted in lever 563, this pin extending through a slot in the side frame and underlying the right hand supporting arm of the universal bar 53, so that the bar will be lifted during the last half of the depression of the multiplication key 533, and will be held up so long as the key remains fully depressed. In these cases the key is released from its fully depressed position during the final cycle, but a shutter cam 598 (Fig. 10), such as that disclosed in patent application Serial No. 176,156, having pin and slot connection with a disk mounted on shaft 72, will control movement of the shaft 81 whereon bail 53 is mounted and will hold the bar in raised position until the termination of the cycle. This shutter cam is also relied upon to hold the bar raised during cycling in Case A examples, in which the multiplication key may immediately return to its half depressed position.

No multiplier indicating wheels have been shown because it is believed that they form no part of the present invention. They would be a convenience, but not a necessity in this machine. Any of the well known multiplier register wheels could be mounted in the carriage 2, if an elongated gear were provided to permit the related counting finger to act while the carriage is shifting. Further, such a register could be installed without difficulty in the base of the machine, as shown, for instance, in the co-pending application Serial No. 285,860, filed by George C. Chase on July 22, 1939, and disclosing a structure designed to be used in connection with the present invention.

I claim:

1. In a calculating machine having value storage wheels and a register comprising numeral wheels; digit value entering means operable to set said storage wheels forwardly or reversely to positions representing lower value digits normally and higher value digits complementally, and means controlled by said wheels for determining the sign character and extent of rotation of said numeral wheels in accordance with the forward or reverse setting of and the normal and complemental values set in said storage wheels.

2. In a calculating machine having a product register, and multiplier value storage wheels; digit value entering means operable to set said storage wheels selectively forwardly or reversely to positions representing lower value digits normally and higher value digits complementally, means controlled by said wheels for operating the machine additively or subtractively in accordance with the forward or reverse setting of a storage wheel to repeatedly register a multiplicand upon said product register, and means controlled by said wheels for determining the duration of each repeated multiplicand registration in accordance with the normal or complemental value set in a storage wheel.

3. A calculating machine according to claim 2, and including adjustable transmission gearing in the digit value entering means, and means for adjusting said gearing selectively into driving connection with the multiplier value storage wheels or with the product register, whereby values may be entered normally and complementally, first as a multiplier and thereafter repeatedly as a multiplicand under control of the multiplier wheels.

4. A calculating machine according to claim 2, and including reversible universal driving means for the digit entering means, whereby the normal and complemental values may be entered in the multiplier storage wheels as a positive or as a negative amount.

5. A calculating machine according to claim 2, and including in the means controlled by the storage wheels a counting finger driven by the operating means in directions related invariably to the additive and to the subtractive character of the registration and operable to return a storage wheel from its set to its initial position by rotation in a direction invariably reverse to the direction of setting rotation thereof.

6. In a calculating machine having a product register, and multiplier value storage wheels; reversely operable digit value entering means for setting said wheels, reversible universal driving means for the entering means operable to enter the digit values as a positive or as a negative amount, and means controlled by said wheels for operating the machine additively or subtractively to repeatedly register a multiplicand upon said product register and to control the duration of such registration, including a sign control element fixed upon each storage wheel, and a counting finger driven by the operating means in directions related invariably to the additive and to the subtractive character of the registration and operable to return a storage wheel from its set to its initial position, whereby positive and negative multiplication is controlled by the setting of the storage wheels.

7. A calculating machine according to claim 6, and wherein the element fixed upon each storage wheel comprises a segment, and additionally including in the means controlled by the storage wheels a plus control feeler located adjacent the normal position of one end of and engageable with said segment, and a minus control feeler located adjacent the normal position of the other end of and engageable with said segment.

8. In a calculating machine having a product register, and multiplier value storage devices including a wheel settable from normal position to represent values; means cooperating with said wheel to control repeated registration of a multiplicand additively or subtractively upon said product register and to control the duration of such registration, including a uniform radius segment fixed upon the storage wheel, a plus control feeler located adjacent the normal position of one end of and engageable with said segment when the related wheel has been set to represent given values, and an independently movable minus control feeler located adjacent the normal position of the other end of and engageable with said segment when said wheel has been set to represent other values.

9. A calculating machine according to claim 8, and including key-operable means for urging said feelers toward the segment.

10. A calculating machine according to claim 8, and including in the means cooperating with the storage wheels additive and subtractive operation initiating means including a plus element having connection with the plus control feeler, a minus element having connection with the minus control feeler, and means for moving said feelers toward the storage wheel segment, the segment of the set storage wheel serving as a fulcrum upon which one feeler or the other will move to operate the related plus or minus element.

11. A calculating machine according to claim 8, and including in the means cooperating with the storage wheels a pair of supporting levers upon which the feelers are intermediately pivoted, plus and minus operation control mechanism having operating connection with the feelers, and manually settable means for rocking the supporting levers to move the feelers toward the storage wheel segment.

12. A calculating machine according to claim 8, and including in the means cooperating with the storage wheel a pair of supporting levers upon which the feelers are intermediately pivoted, plus and minus operation control mechanism having operating connection with the feelers, manually settable means for rocking the supporting levers to move the feelers toward the storage wheel segment, a latch for the settable means, and connections between the feelers and the latch acting to operate the latch upon displacement of either feeler by the storage wheel segment.

13. A calculating machine according to claim 8, wherein a plurality of multiplier storage wheels are provided each with a segment, and including a shiftable carriage support for the multiplier storage wheels, carriage shifting means, means including an operation key for urging the feelers toward one of the segments, and means adjustable to active position by the feelers in feeling the zero position of the controlling segment and operable by said key to effect operation of the carriage shifting means.

14. In a calculating machine having a laterally shiftable carriage, a product register, and multiplier storage wheels mounted thereon, a motor, a driving train between said motor and the register, and a normally disengaged clutch in said train; means cooperating with the storage wheels to control repeated registration of a multiplicand upon said product register, including a segment fixed upon each storage wheel, positively operable means, including a feeler designed for operation by successive segments in the shifting movement of the carriage, to engage the clutch, and a spring operable to disengage the clutch upon rotation of the segment out of engagement with the feeler.

15. A calculating machine according to claim 14 wherein the feeler lies normally in inoperative position, and including in the means cooperating with the storage wheels a supporting lever upon which the feeler is pivoted, and manually settable means for rocking the supporting lever to move the feeler to operative position.

16. A calculating machine according to claim 14 and including in the means cooperating with the storage wheels two members alternatively operable to determine the sign character of a registration and to engage the clutch, one of said members being operable by the feeler, and a second feeler alternatively operable by the segments to operate the other sign determining member.

17. In a calculating machine having a product register and multiplier value storage wheels; means cooperating with said wheels to control repeated registration of a multiplicand upon said product register, including means operable to sense the presence of a value other than zero stored in a storage wheel, registration drive means operable also to restore the storage wheels successively to zero indicating position, means controlled by said sensing means to initiate operation of the drive means, a carriage movable to effect a shift of said storage wheels relative to and to effect operation of the sensing means, carriage shifting means, means controlled by the sensing means for interrupting the registration drive, means operable by the interrupting means to effect operation of the shifting means, a latch serving to hold the shifting means in operation, and means operable in time with the registration drive to release said latch.

18. In a calculating machine having a product register, and multiplier value storage wheels; means cooperating with said wheels to control repeated registration of a multiplicand upon said product register, including means shiftably related to said wheels and engageable therewith to sense the presence of a value other than zero stored in the wheel standing in a given shifted controlling position, registration initiating and terminating means operable by said sensing means, means shiftably related to said wheels and adapted to sense the presence of a value other than zero stored in any one of said wheels located in proximate relation to said controlling position, and means for relatively shifting said wheels and both said sensing means, including control elements operable by the last-named sensing means to determine the shift.

19. A calculating machine according to claim 18, and including means operable to adjust the registration initiating sensing means to active position, and means operable by the shift controlling sensing means to maintain the adjusting means in operated position.

20. A calculating machine according to claim 18, and including means operable to adjust the registration initiating sensing means to active position, a latch operable by the shift controlling sensing means to maintain the adjusting means in operated position in response to the sensing of a value other than zero, and a second latch operable jointly by the two sensing means to maintain the adjusting means in operated position in response to the sensing of a value other than zero in the controlling wheel and the sensing of zeros in the other wheels.

21. A calculating machine according to claim 18, in which the shift control elements operable by the sensing means cooperate with the registration terminating means to effect a shift, and including an operation initiating key, and additional normally inactive shift control elements adjustable to active position under joint control of the two sensing means and operable by said key to initiate operation of the shifting means.

22. A calculating machine according to claim 18, in which the shift control elements operable by the sensing means cooperate with the registration terminating means to effect a shift, and including an operation initiating key, additional shift control elements operable by said key to initiate operation of the shifting means, and means controlled by the registration initiating sensing means to disable the additional shift control elements when a value other than zero is sensed in the wheel standing in controlling position.

23. A calculating machine according to claim 18, in which the registration initiating sensing means lies normally out of active position and including means operable to adjust said sensing means to active position, and a cooperating device controlled jointly by the registration initiating and by the shift controlling sensing means to maintain the adjusting means in operated position or alternatively to initiate opertaion of the shifting means, in accordance with the sensed values stored in the wheels, and a device operable to maintain the adjusting means in operated position during operation of the shifting means initiated by the jointly controlled device.

24. A calculating machine according to claim 18, in which the shift control elements operable by the sensing means cooperate with the registration terminating means to effect a shift, and in which the registration initiating sensing means lies normally out of active position and including means operable to adjust said sensing means to active position, a latch operable by the shift controlling sensing means to maintain the adjusting means in operated position in response to the sensing of a value other than zero, and a device cooperating with the adjusting means and controlled for differential operation jointly by the registration initiating and by the shift controlling sensing means to maintain the adjusting means in operated position, to initiate operation of the shifting means or alternatively to operate idly, in accordance with values stored in the wheels.

25. A calculating machine according to claim 18, in which the shift control elements operable by the sensing means cooperate with the registration terminating means to effect a shift, and in which the registration initiating sensing means lies normally out of active position and including manually settable, freely retractible means operable to adjust the registration initiating sensing means to active position, a latch operable by the shift controlling sensing means to maintain the adjusting means in operated position in response to the sensing of a value other than zero, and a device cooperating with the adjusting means and controlled for differential operation jointly by the registration initiating and by the shift controlling sensing means to maintain the adjusting means in operated position, to initiate operation of the shifting means or alternatively to operate idly, in accordance with values stored in the wheels.

26. A calculating machine according to claim 18, and wherein the shift control elements are normally inoperative and in which the registration initiating sensing means lies normally out of active position, including means operable to adjust said sensing means to active and the shift control elements to operative position, said elements cooperating with the registration terminating means to effect a shift, and means connected with the shift controlling sensing means to maintain the adjusting means in operated position.

27. A calculating machine according to claim 18, and including reverse shifting means including control elements normally lying in an inactive position, an operation controlling key, connections whereby depression of said key will adjust the shift control elements to active position, a normally restrained latch releasable by the shift controlling sensing means and serving to hold the shift control elements as adjusted, means operable to adjust the reverse shift control elements to active position upon release of said latch, a latch serving to hold the reverse shift control elements in active position, and means for holding the reverse shift latch released in the initial extreme shifted position of the parts.

28. A calculating machine according to claim 18, wherein the shift control elements are adjustable into position for operation by the registration te minating means, and including reverse shifting means including control elements adjustable into position for operation by the registration terminating means, a spring retracted operation controlling key, connections whereby depression of said key will adjust the shift control elements into active and the reverse shift control elements into an inactive position relative to the registration terminating means, a normally restrained latch releasable by the shift controlling sensing means and serving to hold the key depressed, a latch serving upon release of the first named latch to hold the key in semi-depressed position and the reverse shift control elements in active relation to the registration terminating means, means for releasing the last named latch in one extreme shifted position of the parts, and a latch releasable as an incident to the return of the key to raised position and serving to hold the reverse shift control elements in operated position.

29. In a calculating machine having a register comprising numeral wheels, differential actuators for said wheels, a series of value storage wheels, and transmission gearing adjustable to connect the register wheels or alternatively the storage wheels with said differential actuators; a connecting train serving normally to hold the transmission gearing positively in the first-named position, comprising pivotally mounted supporting frames for the transmission gears, a shaft having an eccentric connection with one of said frames, said connection normally standing in dead center position, and spring retractible means operable to rotate said shaft; a spring retracted key manually settable to operate said retractible means to adjust the transmission gearing into the last-named position, and a latch engageable with the key to hold it in set position.

30. In a calculating machine having a product register, and multiplier value storage wheels; means cooperating with said wheels to control repeated registration of a multiplicand upon said product register, including means shiftably related to said wheels and engageable therewith to sense the presence of, a value other than zero stored in the wheel standing in a given shifted controlling position, registration means including initiating and terminating control elements connected to the sensing means, shifting means having control elements operable by said registration terminating elements to initiate a shifting operation, a latch serving to hold the shifting means in active position against the tension of a spring, said sensing means cooperating with a wheel in which a value has been stored, as said wheel is shifted into controlling position, to re-initiate a registering operation and to continue said operation during further relative shifting movement, and means operable by the registering means to release the latch.

GEORGE C. CHASE.